US012341296B2

(12) United States Patent
Little

(10) Patent No.: US 12,341,296 B2
(45) Date of Patent: Jun. 24, 2025

(54) ELECTRICAL CONNECTOR HAVING A GROUND BAR AND A GROUND BRIDGE CONNECTED TO THE GROUND BAR AND TO A GROUND CONTACT

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventor: Terrance F. Little, Fullerton, CA (US)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 457 days.

(21) Appl. No.: 17/739,088

(22) Filed: May 7, 2022

(65) Prior Publication Data

US 2022/0368077 A1 Nov. 17, 2022

Related U.S. Application Data

(60) Provisional application No. 63/267,812, filed on Feb. 10, 2022, provisional application No. 63/201,807, filed on May 13, 2021.

(51) Int. Cl.

| | |
|---|---|
| *H01R 13/64* | (2006.01) |
| *H01R 4/02* | (2006.01) |
| *H01R 13/405* | (2006.01) |
| *H01R 13/516* | (2006.01) |
| *H01R 13/627* | (2006.01) |
| *H01R 13/639* | (2006.01) |
| *H01R 13/6471* | (2011.01) |

(52) U.S. Cl.

CPC ......... *H01R 13/6471* (2013.01); *H01R 4/023* (2013.01); *H01R 13/405* (2013.01); *H01R 13/516* (2013.01); *H01R 13/6272* (2013.01); *H01R 13/639* (2013.01)

(58) Field of Classification Search

None

See application file for complete search history.

(56) References Cited

U.S. PATENT DOCUMENTS

| | | | |
|---|---|---|---|
| 9,004,942 B2 | 4/2015 | Paniagua et al. | |
| 9,124,009 B2 | 9/2015 | Atkinson | |
| 9,660,384 B2 | 5/2017 | Paniagua | |
| 9,735,495 B2 | 8/2017 | Gross | |
| 10,381,767 B1 | 8/2019 | Milbrand, Jr. et al. | |
| 10,468,829 B2 | 11/2019 | Zerebilov et al. | |
| 10,777,921 B2 | 9/2020 | Lu et al. | |
| 11,381,038 B1 * | 7/2022 | Patel | H01R 13/65914 |
| 11,495,909 B2 * | 11/2022 | Laurx | H01R 13/6585 |
| 2019/0245288 A1 | 8/2019 | Lloyd et al. | |

(Continued)

*Primary Examiner* — Ross N Gushi

(74) *Attorney, Agent, or Firm* — Ming Chieh Chang

(57) ABSTRACT

An electrical connector includes: a contact unit including plural pairs of signal contacts and plural ground contacts between adjacent pairs of signal contacts; a cable including plural wires terminated to the contact unit; a ground bar retaining the cable to the contact unit; and a ground bridge connected at a rear thereof to the ground bar and connected at a front thereof to at least one of the plural ground contacts.

5 Claims, 13 Drawing Sheets

(56) References Cited

U.S. PATENT DOCUMENTS

| | | | |
|---|---|---|---|
| 2020/0083627 | A1 | 3/2020 | Peloza et al. |
| 2020/0266584 | A1 | 8/2020 | Lu |
| 2020/0366017 | A1 | 11/2020 | Blackburn et al. |
| 2021/0050683 | A1 | 2/2021 | Sasame et al. |
| 2021/0351536 | A1 | 11/2021 | Chung et al. |
| 2022/0029360 | A1 | 1/2022 | Little et al. |

* cited by examiner

ELECTRICAL CONNECTOR HAVING A GROUND BAR AND A GROUND BRIDGE CONNECTED TO THE GROUND BAR AND TO A GROUND CONTACT

CROSS REFERENCE TO RELATED APPLICATIONS

This application claims priority to and the benefit of U.S. Provisional Patent Applications No. 63/201,807, filed on May 13, 2021, and No. 63/267,812, filed on Feb. 10, 2022, the contents of which are incorporated entirely herein by reference.

BACKGROUND OF THE INVENTION

1. Field of the Invention

The present invention relates to an electrical connector comprising: a contact unit including plural pairs of signal contacts and plural ground contacts between adjacent pairs of signal contacts; a cable including plural wires terminated to the contact unit; a ground bar retaining the cable to the contact unit; and a ground bridge that extends over the top of a front of the cable.

2. Description of Related Arts

U.S. Patent Application Publication No. 2020/0366017 discloses a cable assembly including a cable module having a ground shield, wherein the ground shield has a ground plate held in a housing thereof and plural ground blades located between adjacent cable wires. The ground blades are configured to be electrically connected to the ground plate that extends over the tops of the cable wires.

U.S. Pat. No. 9,660,384 discloses an electrical connector comprising hybrid shields with lossy portions and conductive portions to allow the hybrid shields to be relatively thin such that they can be incorporated into the mating interface regions or other mechanically constrained regions of the connector to provide adequate crosstalk suppression without undesirably impacting impedance. The conductive portions may be shaped to preferentially position the conductive regions adjacent signal conductors susceptible to cross talk. In some embodiments, the conductive portions may be formed of a metal foil, or may be formed of conductive ink that is "painted" onto the lossy material.

U.S. Patent Application Publication No. 2021/0050683 discloses an electrical connector including a housing having opposite first and second sidewalls and a cavity therebetween, first and second sets of terminals disposed in the cavity adjacent to the first and second sidewalls, first and second insulative members supporting the first and second sets of terminals, and a resonant damping component disposed in the cavity between the first and second sets of terminals, wherein the resonant damping component has ridges and the insulative member has notches so that the former is electrically coupled to ground terminals of the first and second sets of terminals.

U.S. Pat. No. 10,777,921 discloses a card edge connector including a conductive plastic member. U.S. Patent Application Publication No. 2020/0083627 discloses a connector assembly including a free-end connector and a mating fixed-end connector, wherein the fixed-end connector has a plug housing, plug wafers joined together within the plug housing, and ground lead frames that provide ground communing. U.S. Patent Application Publication No. 2020/

0266584 discloses an electrical connector including an insulative housing, a first and second terminal subassemblies disposed in the housing, and a lossy member disposed in the housing, wherein the lossy member is comprised of a body portion and a plurality of projections extending from the body portion, and wherein the projections of the lossy member are comprised of a plurality of contact portions that extend towards intermediate portions of first and second terminals.

An improved arrangement is desired to have the cable directly electrically connect to the other component via a signal connector rather than cooperation of plural connectors.

SUMMARY OF THE INVENTION

An object of the present invention is to provide an electrical connector with high electric performance.

An electrical connector comprises: a contact unit including plural pairs of signal contacts and plural ground contacts between adjacent pairs of signal contacts; a cable including plural wires terminated to the contact unit; a ground bar retaining the cable to the contact unit; and a ground bridge connected at a rear thereof to the ground bar and connected at a front thereof to at least one of the plural ground contacts.

Other objects, advantages and novel features of the disclosure will become more apparent from the following detailed description when taken in conjunction with the accompanying drawings.

DETAILED DESCRIPTION OF THE PREFERRED EMBODIMENT

Referring to FIGS. 1-13, an electrical connector assembly comprises a cable plug connector 50 and a mating receptacle connector 10 mounted on a printed circuit board 200. The receptacle connector 10 features a tongue in receptacle design where non-cantilever beam tongue is adopted in order to reduce overall mating height. The plug connector 50 features cantilever beam design in order to reduce overall mating height and provide adequate wiping distance.

Figure 1:
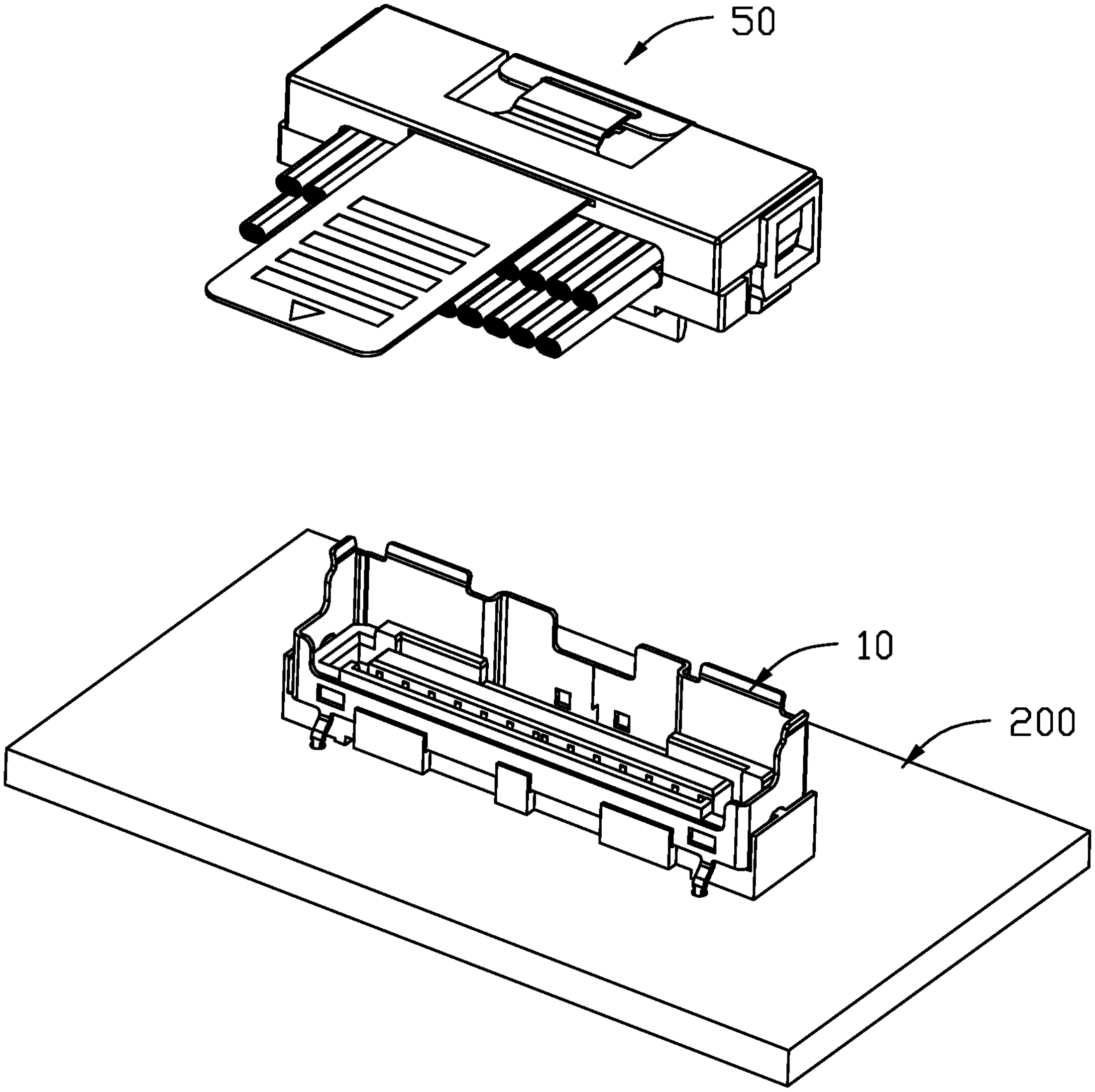
FIG. 1 is a perspective view of an electrical connector assembly in accordance with the present invention mounted on a printed circuit board.
Figure 2:
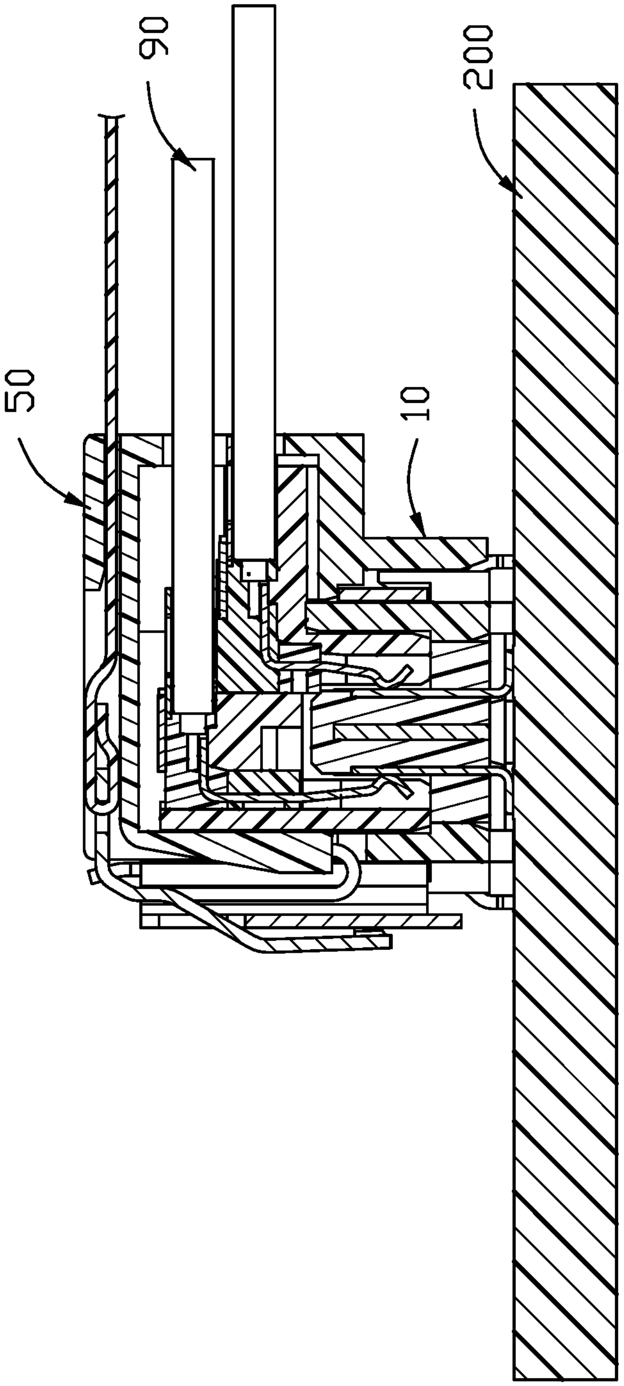
FIG. 2 is a cross-sectional view of the electrical connector assembly.
Figure 3:
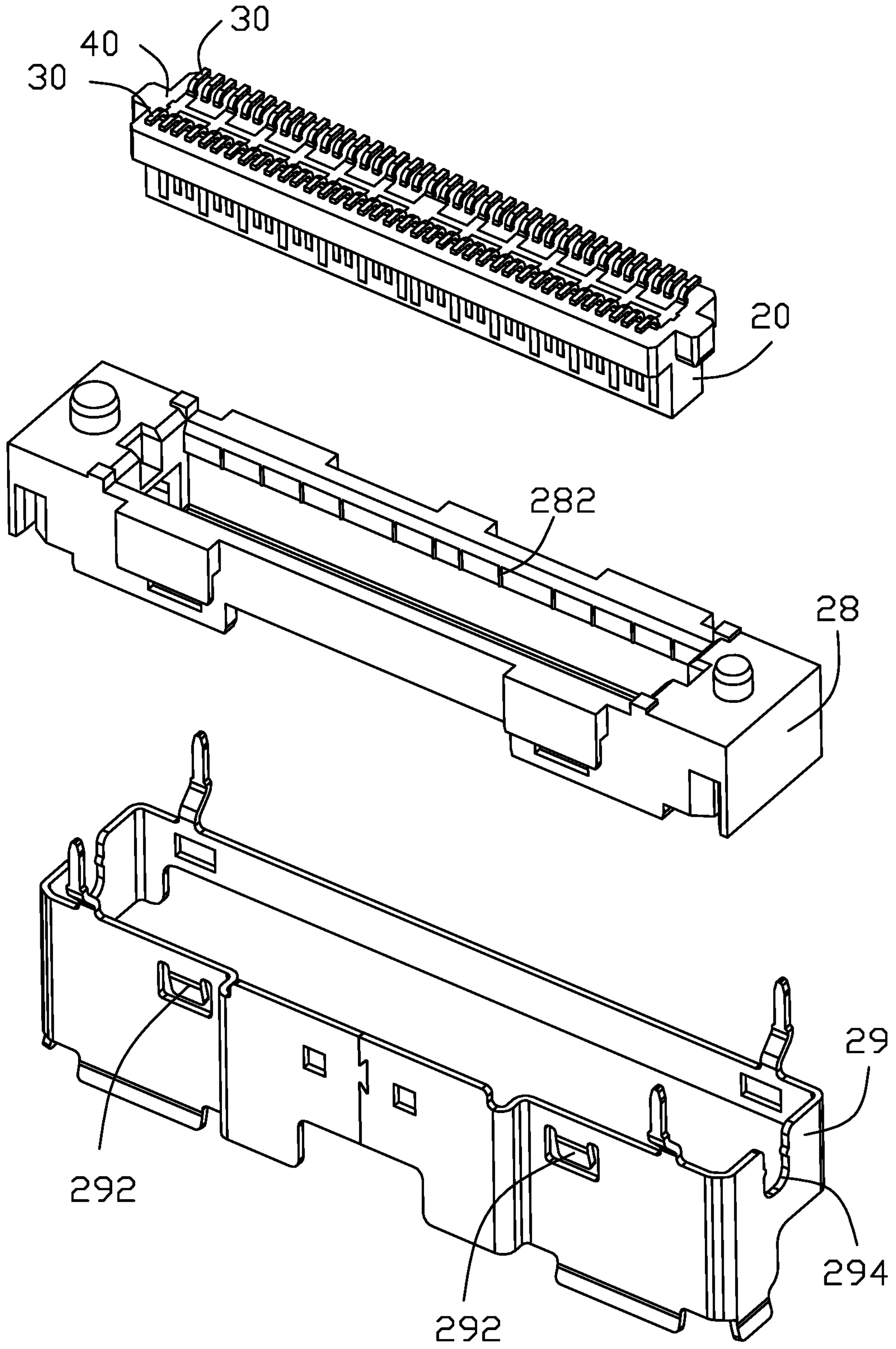
FIG. 3 is a perspective view of a receptacle connector of the electrical connector assembly.
Figure 4:
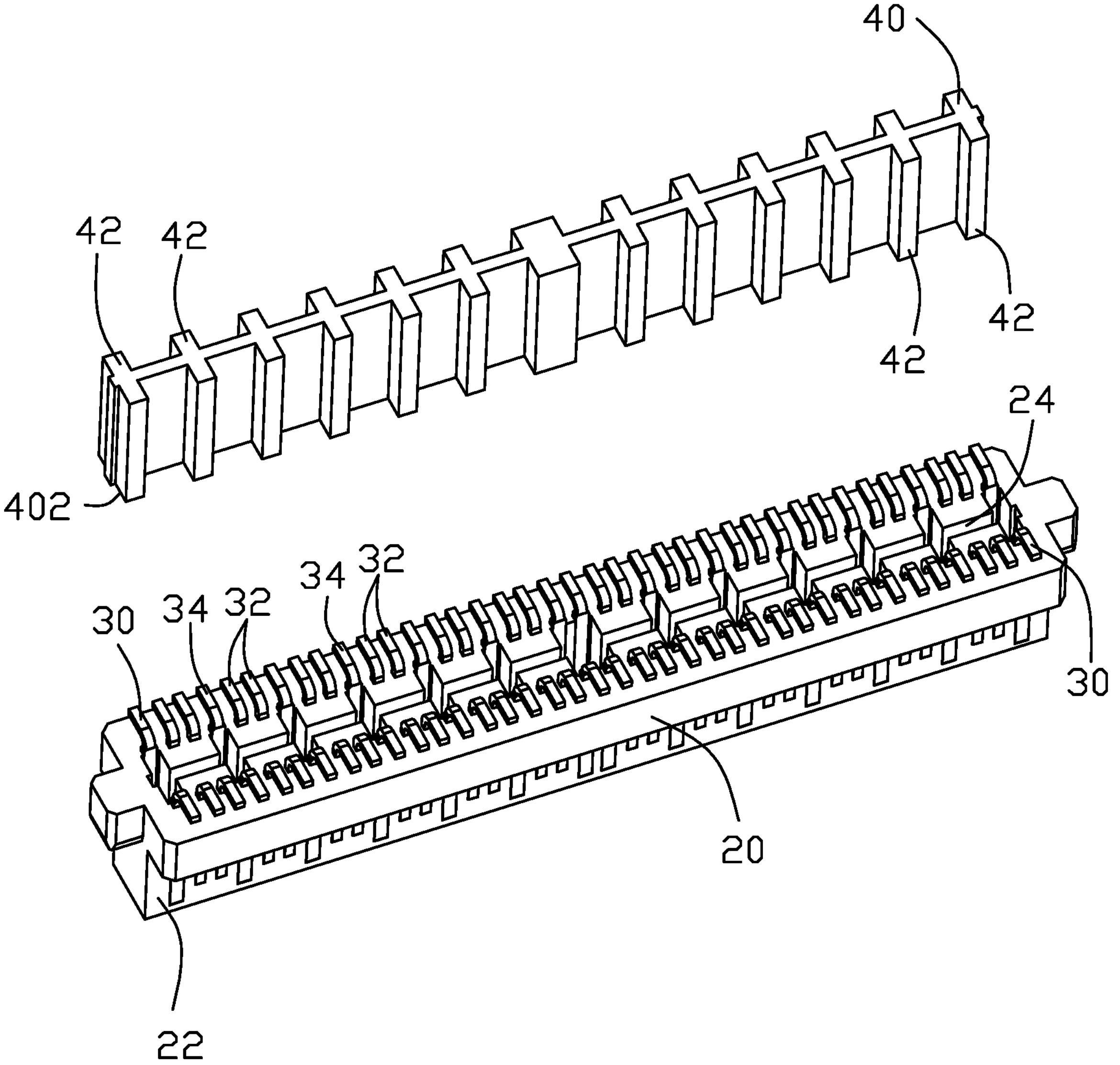
FIG. 4 is an exploded view of the receptacle connector.
Figure 5:
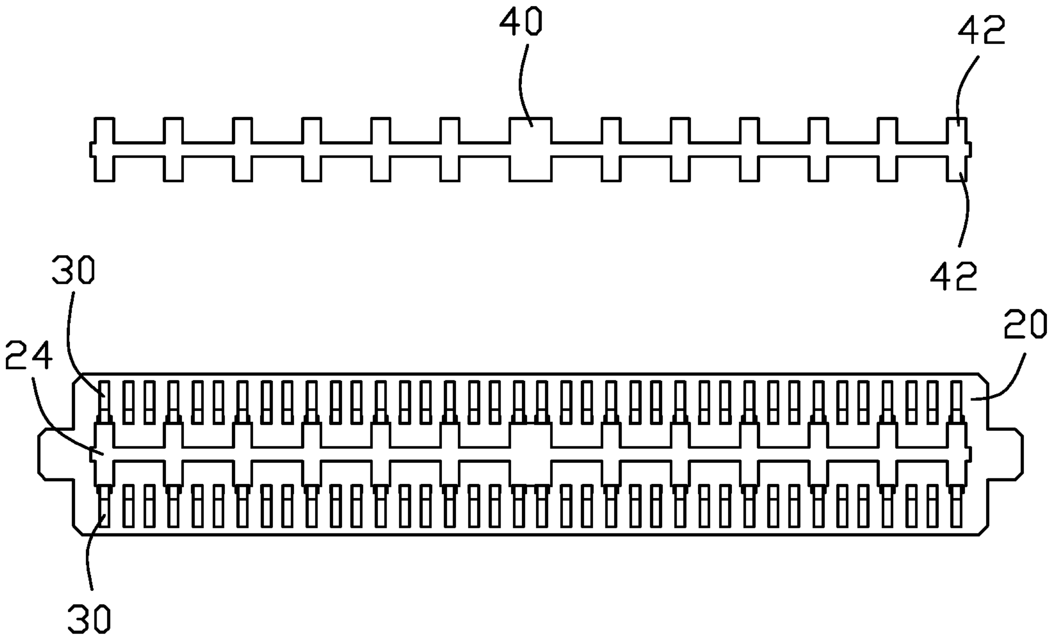
FIG. 5 is a bottom plan view of FIG. 4.
Figure 6:
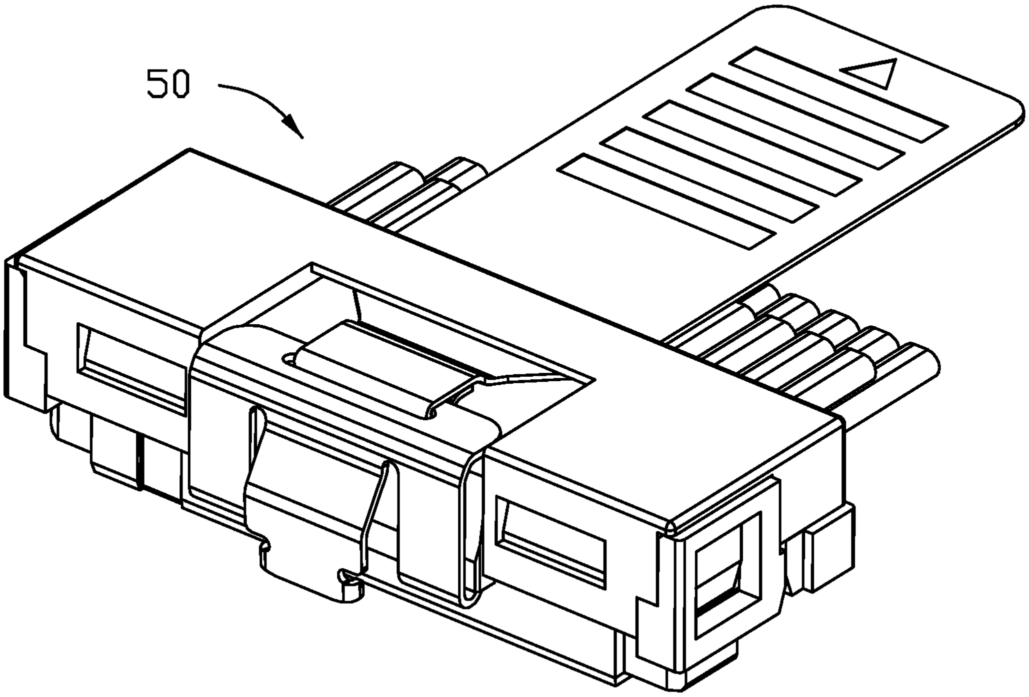
FIG. 6 is a perspective view of a plug connector of the electrical connector assembly.
Figure 7:
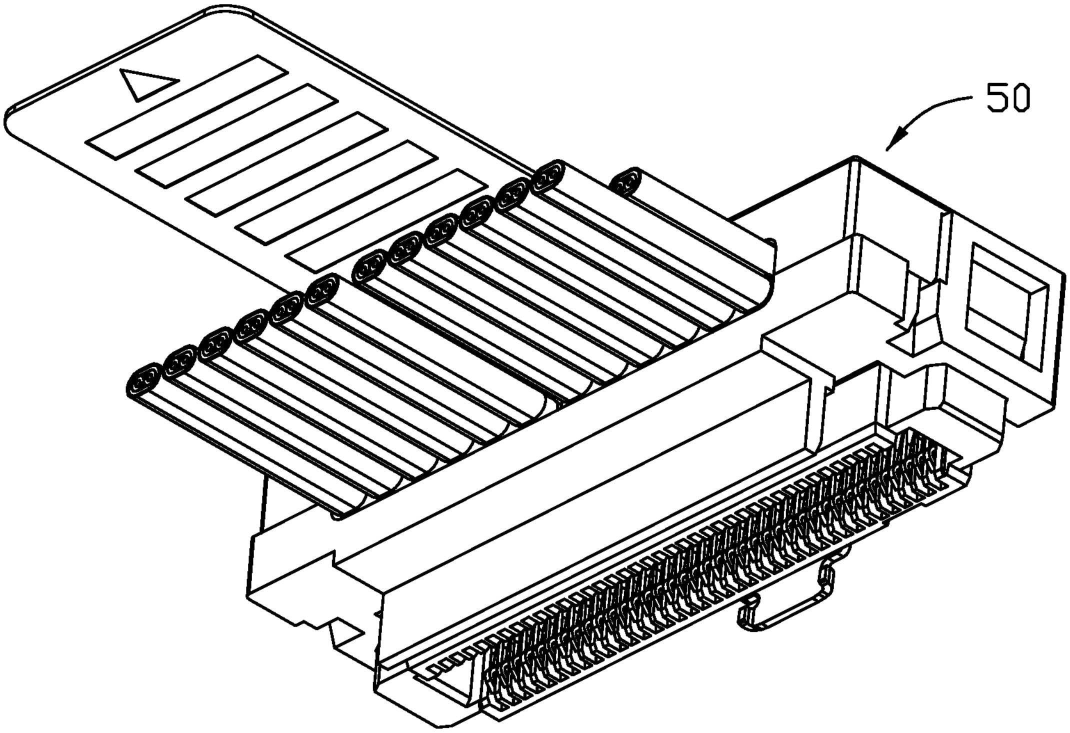
FIG. 7 is another perspective view of the plug connector.
Figure 8:
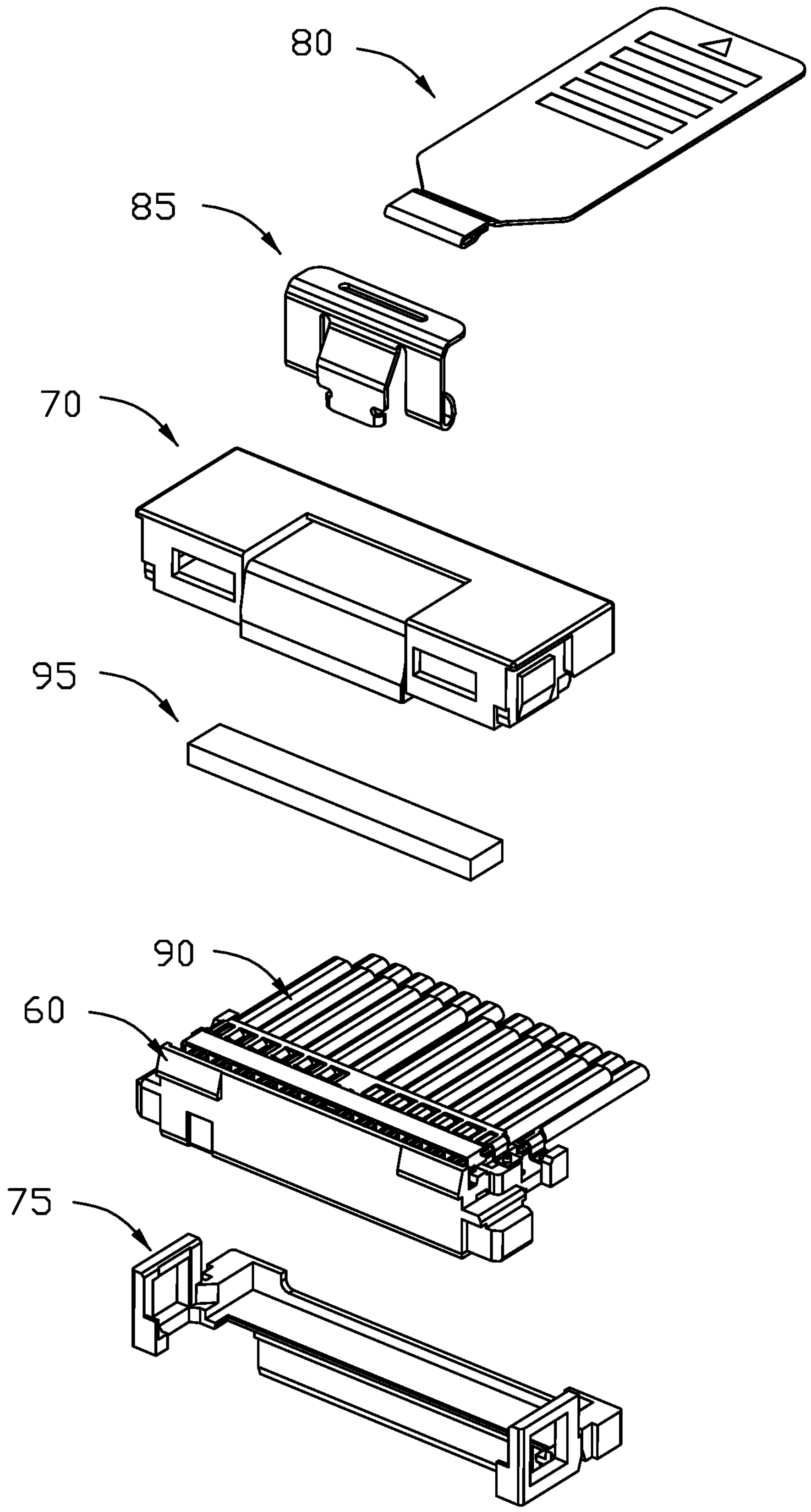
FIG. 8 is an exploded view of the plug connector in FIG. 6.
Figure 9:
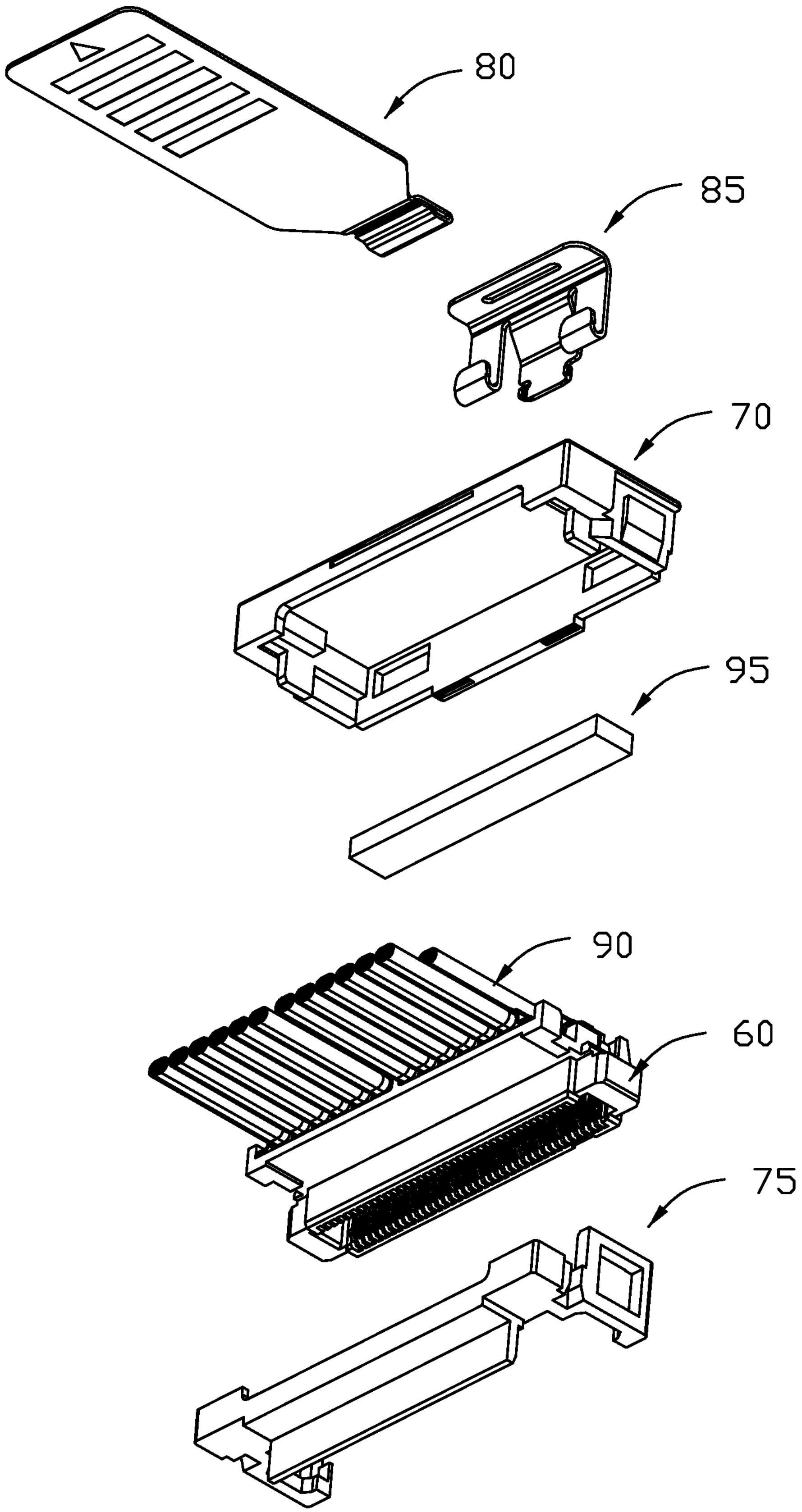
FIG. 9 is an exploded view of the plug connector in FIG. 7.
Figure 10:
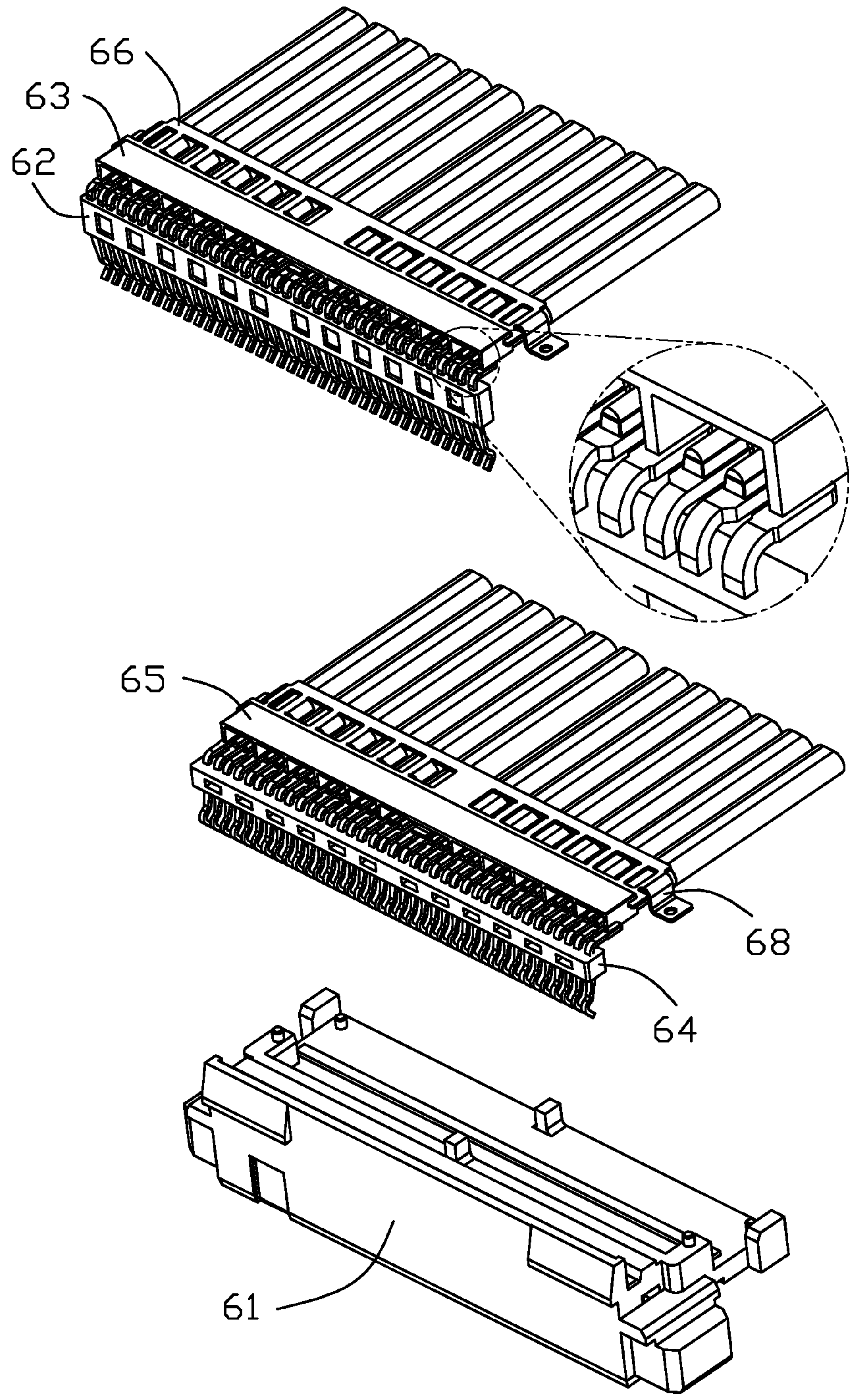
FIG. 10 is a further exploded view of a plug contact assembly of the plug connector.
Figure 11:
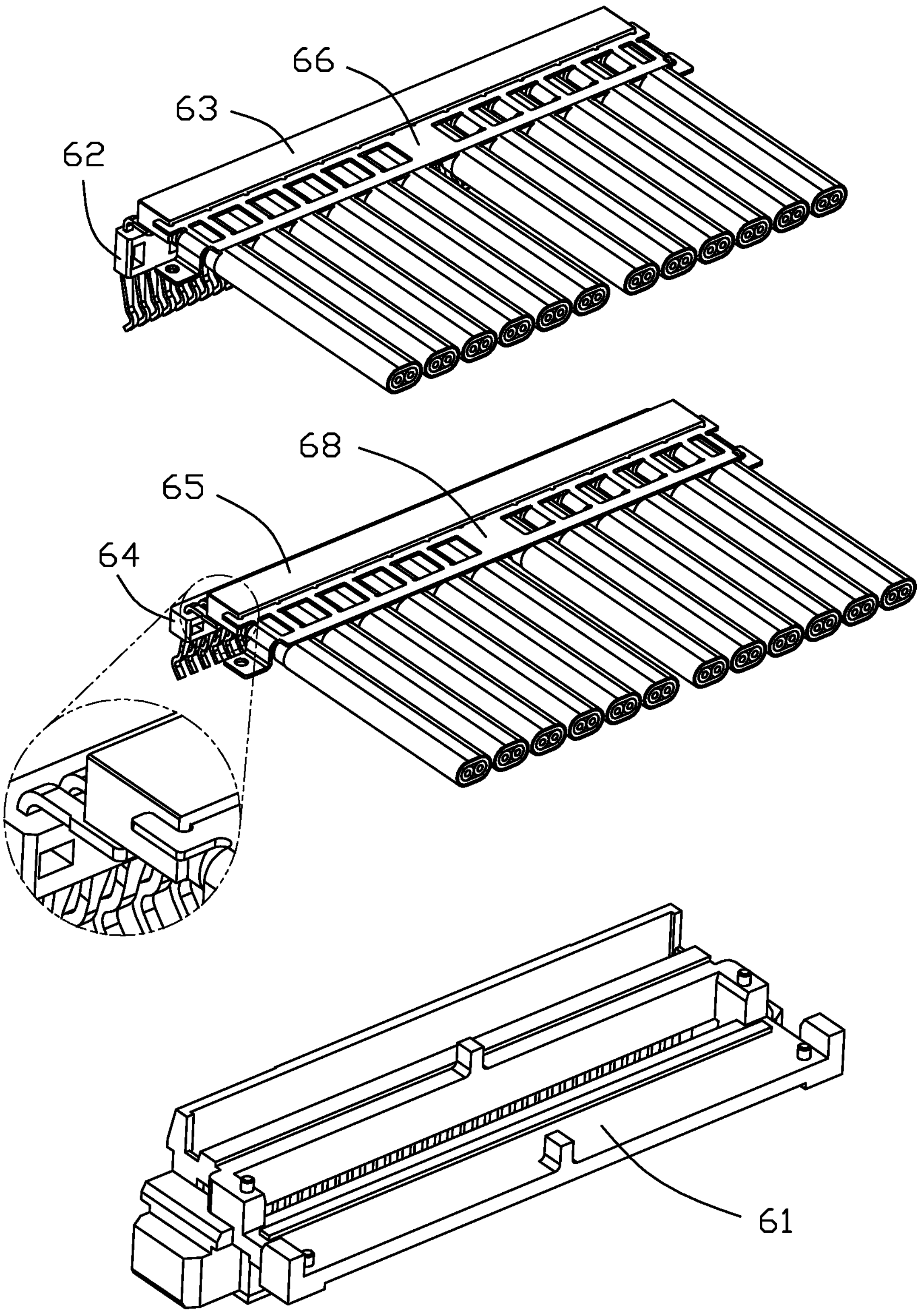
FIG. 11 is a view similar to FIG. 10 but from another perspective.
Figure 12:
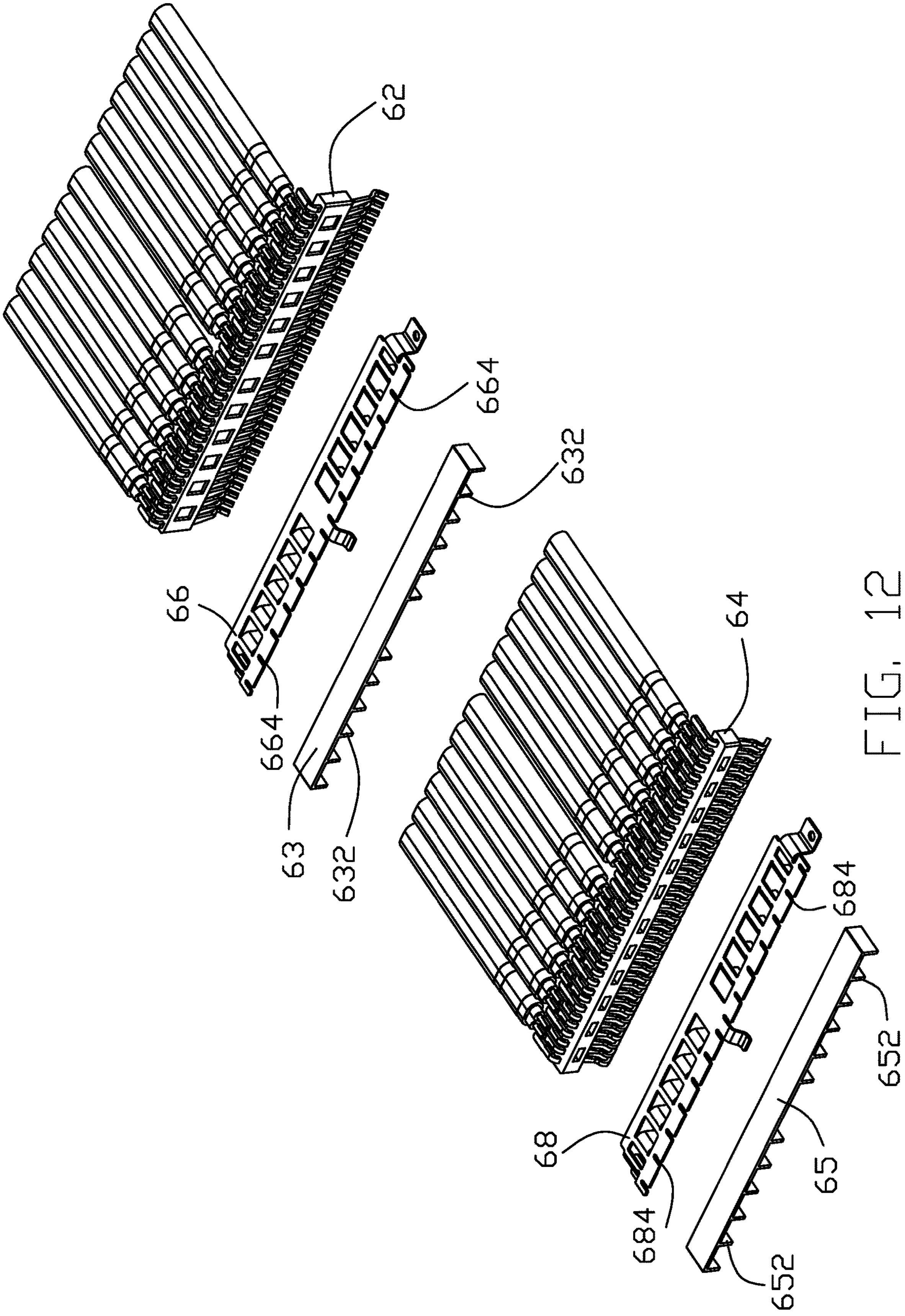
FIG. 12 is a still further exploded view of the plug contact assembly in FIG. 10.
Figure 13:
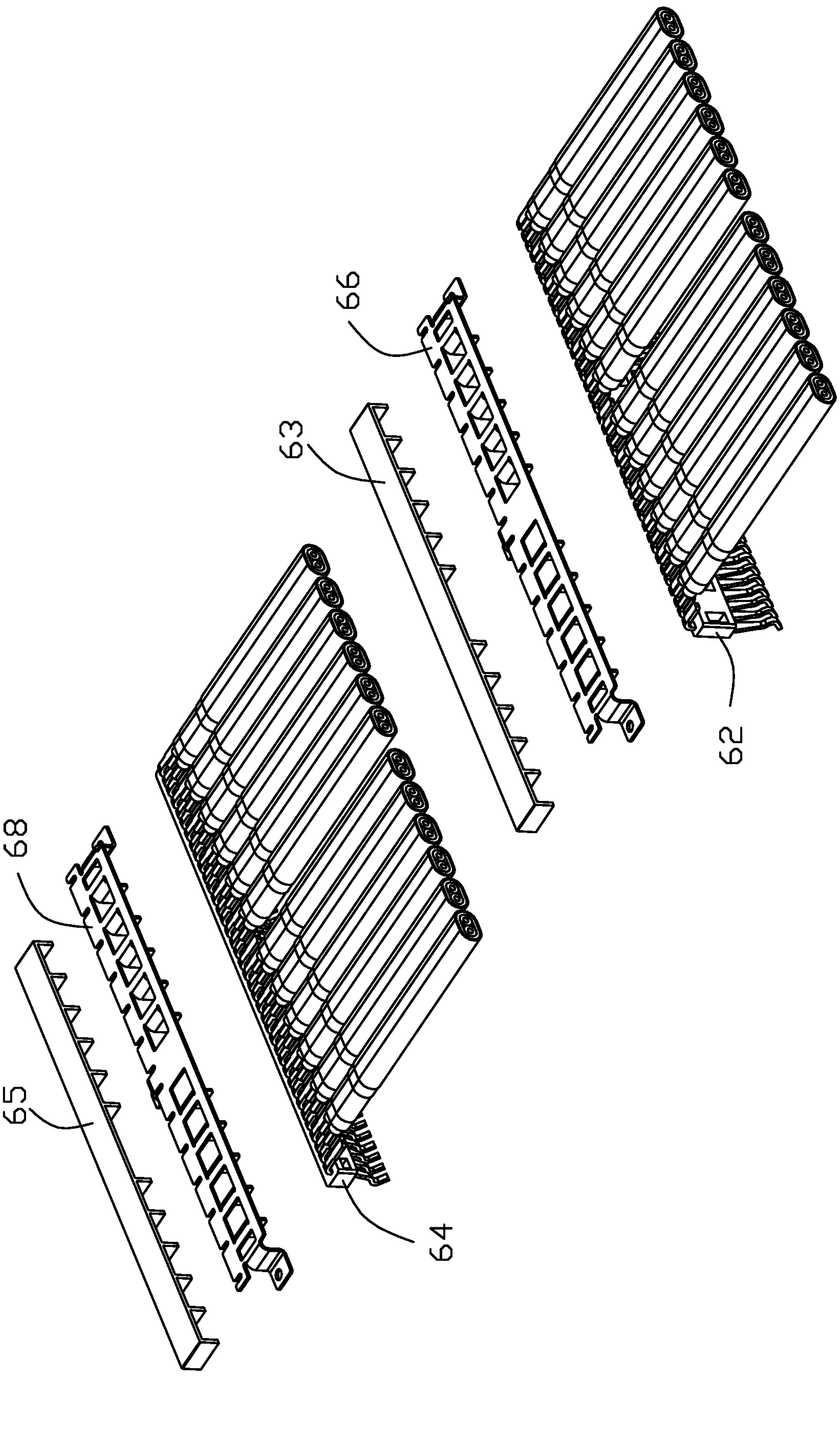
FIG. 13 is a view similar to FIG. 12 but from another perspective.

Referring to FIGS. 3-5 in particular, the receptacle connector 10 includes a unitary insulative housing 20 having a tongue 22 and a cavity 24, two rows of terminals 30 molded in the insulative housing 20 while exposing respectively to two opposite surfaces of the tongue 22, and a conductive plastic member 40. Each row of terminals 30 includes a plurality of signal terminals 32 and a plurality of ground terminals 34 and the plurality of ground terminals 34 are exposed to the cavity 24. The conductive plastic member 40 is molded in the cavity 24 to be electrically coupled to the plurality of ground terminals 34. In a varied design, the conductive plastic member 40 may be replaced by or combined with liquid metal ink or conductive ink that flows and then is cured in the cavity 24.

The receptacle connector 10 may further include a shroud 28 enclosing the insulative housing 20 and a receptacle shell 29 enclosing the shroud 28. The shroud 28 may have features such as ribs 282 for retaining the insulative housing 20. The shell 29 may have retention features such as tabs 292 and barbs 294 for retaining to the shroud 28. The signal terminals 32 are preferably arranged in pairs for differential signals transmission.

The conductive plastic member 40 has two rows of branches 42 aligned with corresponding ground terminals 34 so that when the former is molded in place all ground terminals 34 are in contact therewith. Each ground terminal 34 has a contacting portion, and the conductive plastic member 40 has an upper surface 402 substantially leveled with an upper end of the contacting portion, as is clearly seen in FIG. 2, for improved signal integrity.

Referring to FIGS. 6-13 in particular, the plug connector 50 includes a plug contact assembly 60 with a cable 90 terminated thereto, an upper cover 70 and a lower cover 75, a pull strap 80 and a latch 85, and a hot melt glue 95. The cable 90 is arranged in an upper and lower rows of wires. The contact assembly 60 includes an insulative housing 61, a front contact unit 62, a rear contact unit 64, an upper ground bar 66 retaining the upper row of cable wires to the front contact unit 62, an upper ground bridge 63 connected between the upper ground bar 66 and the front contact unit 62, a lower ground bar 68 retaining the lower row of cable wires to the rear contact unit 64, and a lower ground bridge 65 connected between the lower ground bar 68 and the rear contact unit 64. Each of the front contact unit 62 and the rear contact unit 64 is structured as an insert molded lead frame assembly, namely, each unit having respective contacts corresponding to an associated row of terminals 30. The front contact unit 62 and the rear contact unit 64 are inserted into corresponding slots of the insulative housing 61. Both the upper and lower ground bars 66 and 68 may be suitably secured to securing features disposed on the insulative housing 61. Each ground bridge 63 or 65 has plural separation walls 632 or 652 for connecting to corresponding ground terminals 34. The cable 90 may be twin-ax raw cable wires directly attached to pairs of the signal terminals 32 in a well known manner with respective shielding layers thereof being in contact with associated ground bar.

Each of the upper and lower ground bridges 63 and 65 has a horizontal cover body and a plurality of vertical separation walls 632 or 652. The ground bar 66 or 68 has a plurality of front notches 664 or 684. The separation wall 632 or 652 engages the notch 664 or 684 at a rear upper end thereof and is soldered to a corresponding ground contact at a front lower end thereof. After attaching the ground bars, terminating the cable, and mounting the ground bridges, the hot melt glue 95 may suitably be injection molded in place. Thereafter, the upper cover 70 and the lower cover 75 may be assembled and also the pull strap 80 and the latch 85 may be mounted. The ground bridge shields a terminating end of each wire.

While a preferred embodiment in accordance with the present disclosure has been shown and described, equivalent modifications and changes known to persons skilled in the art according to the spirit of the present disclosure are considered within the scope of the present disclosure as described in the appended claims.

What is claimed is:

1. An electrical connector comprising:

a contact unit including plural pairs of signal contacts and plural ground contacts between adjacent pairs of signal contacts;

a cable including plural wires terminated to the contact unit;

a ground bar retaining the cable to the contact unit; and a ground bridge being separate and distinct from the plural ground contacts and connected at a rear thereof to the ground bar and connected at a front thereof to at least one of the plural ground contacts; wherein the ground bridge has a separation wall situated between two adjacent pairs of signal contacts and soldered to the at least one ground contact.

2. The electrical connector as claimed in claim 1, wherein the ground bar has a front notch, and the separation wall engages the front notch.

3. The electrical connector as claimed in claim 1, wherein each wire has a terminating end and the ground bridge shields the terminating end.

4. An electrical connector comprising:

a contact unit including plural pairs of signal contacts and plural ground contacts between adjacent pairs of signal contacts;

a cable including plural wires terminated to the contact unit;

a ground bar retaining the cable to the contact unit; and a ground bridge connected at a rear thereof to the ground bar and connected at a front thereof to at least one of the plural ground contacts;

wherein the ground bridge has a separation wall situated between two adjacent pairs of signal contacts and soldered to the at least one ground contact.

5. An electrical connector comprising:

a contact unit including plural pairs of signal contacts and plural ground contacts between adjacent pairs of signal contacts;

a cable including plural wires terminated to the contact unit;

a ground bar retaining the cable to the contact unit; and a ground bridge connected at a rear thereof to the ground bar and connected at a front thereof to at least one of the plural ground contacts;

wherein the ground bar has a front notch, and the ground bridge has a separation wall engaging the notch and situated between two adjacent pairs of signal contacts.

* * * * *